United States Patent
Yang

(10) Patent No.: US 11,680,878 B2
(45) Date of Patent: Jun. 20, 2023

(54) OBJECT PRESS PERFORMANCE MEASURING SYSTEM

(71) Applicant: CHICONY ELECTRONICS CO., LTD., New Taipei (TW)

(72) Inventor: Chen-You Yang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 295 days.

(21) Appl. No.: 17/211,367

(22) Filed: Mar. 24, 2021

(65) Prior Publication Data
US 2021/0302290 A1 Sep. 30, 2021

(30) Foreign Application Priority Data

Mar. 25, 2020 (TW) ................................. 109110082
Mar. 19, 2021 (TW) ................................. 110110051

(51) Int. Cl.
*G01N 3/04* (2006.01)
*G01N 3/08* (2006.01)
*G01N 3/06* (2006.01)

(52) U.S. Cl.
CPC ................. *G01N 3/04* (2013.01); *G01N 3/08* (2013.01); *G01N 3/066* (2013.01)

(58) Field of Classification Search
CPC ............. G01N 3/04; G01N 3/08; G01N 3/066
See application file for complete search history.

(56) References Cited

U.S. PATENT DOCUMENTS 10,488,283 B2 * 11/2019 Sumi ...................... B60T 7/042
2018/0238749 A1 8/2018 Doko et al.

FOREIGN PATENT DOCUMENTS

| CN | 101968389 A | 2/2011 |
|---|---|---|
| CN | 202648854 U | 1/2013 |
| CN | 103364114 A | 10/2013 |
| CN | 108622052 A | 9/2018 |
| TW | 201640084 A | 11/2016 |

* cited by examiner

*Primary Examiner* — Jamel E Williams
(74) *Attorney, Agent, or Firm* — Muncy, Geissler, Olds & Lowe, P.C.

(57) ABSTRACT

An object press performance measuring system for measuring a pressure value of an object to be measure includes a measuring unit and an elastic assembly. The elastic assembly is disposed between the object to be measured and the measuring unit. The elastic assembly has a first assembly and a second assembly, wherein the second assembly is disposed between the first assembly and the measuring unit and the first assembly performs a first measuring travel of the object to be measured and the second assembly performs a second measuring travel of the object to be measured, wherein the second measuring travel refers to measure the pressure value greater than the pressure measured in the first measuring travel.

20 Claims, 14 Drawing Sheets

OBJECT PRESS PERFORMANCE MEASURING SYSTEM

BACKGROUND OF THE INVENTION

Field of the Invention

The present invention relates to an object press performance measuring system, and more particularly, to an object press performance measuring system capable of steadily obtaining pressure values of the object to be measured and measuring the pressure value less than the gravity of the object to be measured as well.

Description of the Prior Art

In the existing measurement technology, if a pressure value of an object to be measured is less than the weight of the object, the object to be measured is hung on one side of a balance, and the weight is gradually placed on the other side of the balance until both ends are balanced; however, this kind of measurement method requires constantly changing weights and makes it troublesome in operation, meanwhile, hanging the object to be measured on one side of the balance will also cause measurement errors. On the other hand, using an electronic scale instead of a balance fails to measure the pressure value of the object to be measured when the pressure value of the object is less than the gravity of itself since the object to be measured directly touches the electronic scale and the weight of the object to be measured is directly transferred to the electronic scale.

In addition, taking a stylus as an example, before the stylus leaves the factory, each of the pressure values measured during the measure course of the stylus has to be programed in the chip of the stylus. In general, a pressure value range required by the client is for example 2 gw to 360 gw. As abovementioned, the current measurement system needs improvement, especially in obtaining the pressure value less than the gravity of the object to be measured and the pressure value reaches the maximum value that set by the client. Therefore, there is a need for providing a new measuring system to overcome the detects existed in the current measurement system.

SUMMARY OF THE INVENTION

It is an object of the present invention to provide an object press performance measuring system capable of steadily obtaining measuring pressure values of the object to be measured.

The object of the present invention to provide an object press performance measuring system capable of measuring the pressure value less than the gravity of the object to be measured.

In order to achieve the above object, an object press performance measuring system for measuring a pressure value of an object to be measure includes a measuring unit and an elastic assembly. The elastic assembly is disposed between the object to be measured and the measuring unit. The elastic assembly has a first assembly and a second assembly, wherein the second assembly is disposed between the first assembly and the measuring unit and the first assembly performs a first measuring travel of the object to be measured and the second assembly performs a second measuring travel of the object to be measured, wherein the second measuring travel refers to measure the pressure value greater than the pressure measured in the first measuring travel.

According to an embodiment of the present invention, the system further comprising a moving fixture, a driving device, and a control unit, wherein the moving fixture is for carrying the object to be measured; the driving device is connected to the moving fixture; the control unit is signally connected to the measuring unit and the driving device and controls the driving device to drive the moving fixture to move along a moving direction of the object to be measured until the measuring unit measures the pressure value According to an embodiment of the present invention, the control unit controls the driving device to drive the moving fixture to move along the moving direction of the object to be measured until a target pressure value is reached.

According to an embodiment of the present invention, the control unit comprises a programming system, when the measuring unit measures the target pressure value; the programming system programs the object to be measured.

According to an embodiment of the present invention, the driving device comprises a sliding block and a guide rail, wherein the sliding block moves up and down along the moving direction of the object to be measured relative to the guide rail.

According to an embodiment of the present invention, the first assembly further comprising a first housing, a first elastic unit and an actuating element, wherein the first housing comprises a first accommodating groove; one end of the first elastic unit connects with the actuating element and is accommodated in the first accommodating groove; the first accommodating groove has a first arrival surface; the actuating element is movably constrained in the first accommodating groove; when the first measuring travel begins, the actuating element moves within the first accommodating groove relative to the first housing and continuously presses the first elastic unit until the actuating element touches the first arrival surface.

According to an embodiment of the present invention, the first housing comprises a second accommodating groove; the first accommodating groove locates above and communicating with the second accommodating groove; when the first measuring travel begins, the first elastic unit is being pressed and deformed along the moving direction of the object to be measured unit until the first elastic unit completely accommodates within the second accommodating groove.

According to an embodiment of the present invention, the second accommodating groove has a first receiving surface; another end of first elastic unit is constrained within the second accommodating groove and contacts with the first receiving surface; a size of an aperture of the first accommodating groove is greater than a size of an aperture of the second accommodating groove.

According to an embodiment of the present invention, the actuating element comprises a pressing plate and a connection post, the connection post situates beneath the pressing plate and the first elastic unit encircles the connection post; one end of the connection post and one end of the first elastic both connect with the pressing plate.

According to an embodiment of the present invention, the first housing comprises a third accommodating groove, the third accommodating groove locates beneath and communicates with the second accommodating groove; a size of an aperture of the third accommodating groove matches a size of an aperture of the connection post; another end of the connection post is moveably constrained within the third accommodating groove.

According to an embodiment of the present invention, the actuating element is T-shape and the pressing plate and the connection post are integrally formed.

According to an embodiment of the present invention, the first accommodating groove is exposed to a top end of the first housing to form a first opening; the second accommodating groove and the first accommodating groove are aligned to each other along an axis in the moving direction of the object to be measured.

According to an embodiment of the present invention, the third accommodating groove is exposed to a bottom end of the first housing to form a second opening; the second accommodating groove and the third accommodating groove are aligned to each other along an axis in the moving direction of the object to be measured.

According to an embodiment of the present invention, the first assembly further comprises a first cover body for covering the first opening and before the first measuring travel begins, the first elastic unit is not being pressed and contacts with the actuating element for allowing the actuating element to contacts with the cover body.

According to an embodiment of the present invention, the second assembly comprises a second housing and a second elastic unit; the second housing comprises a fourth accommodating groove and a fifth accommodating groove; the fourth accommodating groove situates above and communicates with the fifth accommodating groove; the first assembly accommodates in the fourth accommodating groove; one end of the second elastic unit contacts with a bottom end of the first assembly and another end of the second elastic unit contacts with the fifth accommodating groove.

According to an embodiment of the present invention, the fourth accommodating groove comprising a second arrival surface, when the second measuring travel begins, the first assembly moves within the fourth accommodating groove relative to the second housing and continuously presses the second elastic unit until the first assembly touches the second arrival surface.

According to an embodiment of the present invention, the fifth accommodating groove has a second receiving surface; another end of the second elastic unit is constrained in the fourth accommodating groove and contacts with the second receiving surface.

According to an embodiment of the present invention, the fourth accommodating groove is exposed to a top end of the second housing to form a third opening; the fifth accommodating groove and the fourth accommodating groove are aligned to each other along an axis in the moving direction of the object to be measured The present invention further provides an object press performance measuring system for measuring a pressure value of an object to be measure. The object press performance measuring system has a measuring unit, an elastic assembly, a moving fixture, a driving device and a control unit; the elastic assembly is disposed between the object to be measured and the measuring unit; the moving fixture is carrying the object to be measured; the driving device is connected to the moving fixture; and the control unit is signally connected to the measuring unit and the driving device, wherein the control unit controls the driving device to drive the moving fixture to move along a moving direction of the object to be measured until the measuring unit measures a pressure value of the object to be measured; wherein, the elastic assembly comprising a first housing, a first elastic unit and an actuating element, wherein the first housing comprises a first accommodating groove and a second accommodating groove; the first accommodating groove locates above and communicates with the second accommodating groove; the actuating element is movably constrained in the first accommodating groove; one end of the first elastic unit connects with the actuating element and is accommodated in first accommodating groove; another end of the elastic unit is constrained within the second accommodating groove and contacts with a first receiving surface of the second accommodating groove According to an embodiment of the present invention, the driving device comprises a sliding block and a guide rail, wherein the sliding block moves up and down along the moving direction of the object to be measured relative to the guide rail.

By configuring the elastic assembly of the object press performance measuring system of the present invention, the measuring unit can accurately reflect tiny changes of the pressure value accompany with the moving distance of the object to be measured, and the measuring unit can measure a pressure value less than the gravity of the object to be measured. The object press performance measuring system of the present invention is designed to allow the manufacturer of the object to be measured to obtain the pressure values of the object to be measured to meet the requirement of the client, and the elastic assembly of the present invention can further divide the target pressure value range into several pressure value intervals and the first assembly and the second assembly designed to conduct the measurement in different intervals respectively to improve the accuracy and production efficiency of programming and manufacturing these kinds of objects.

DETAILED DESCRIPTION OF THE EMBODIMENTS

Figure 1A:
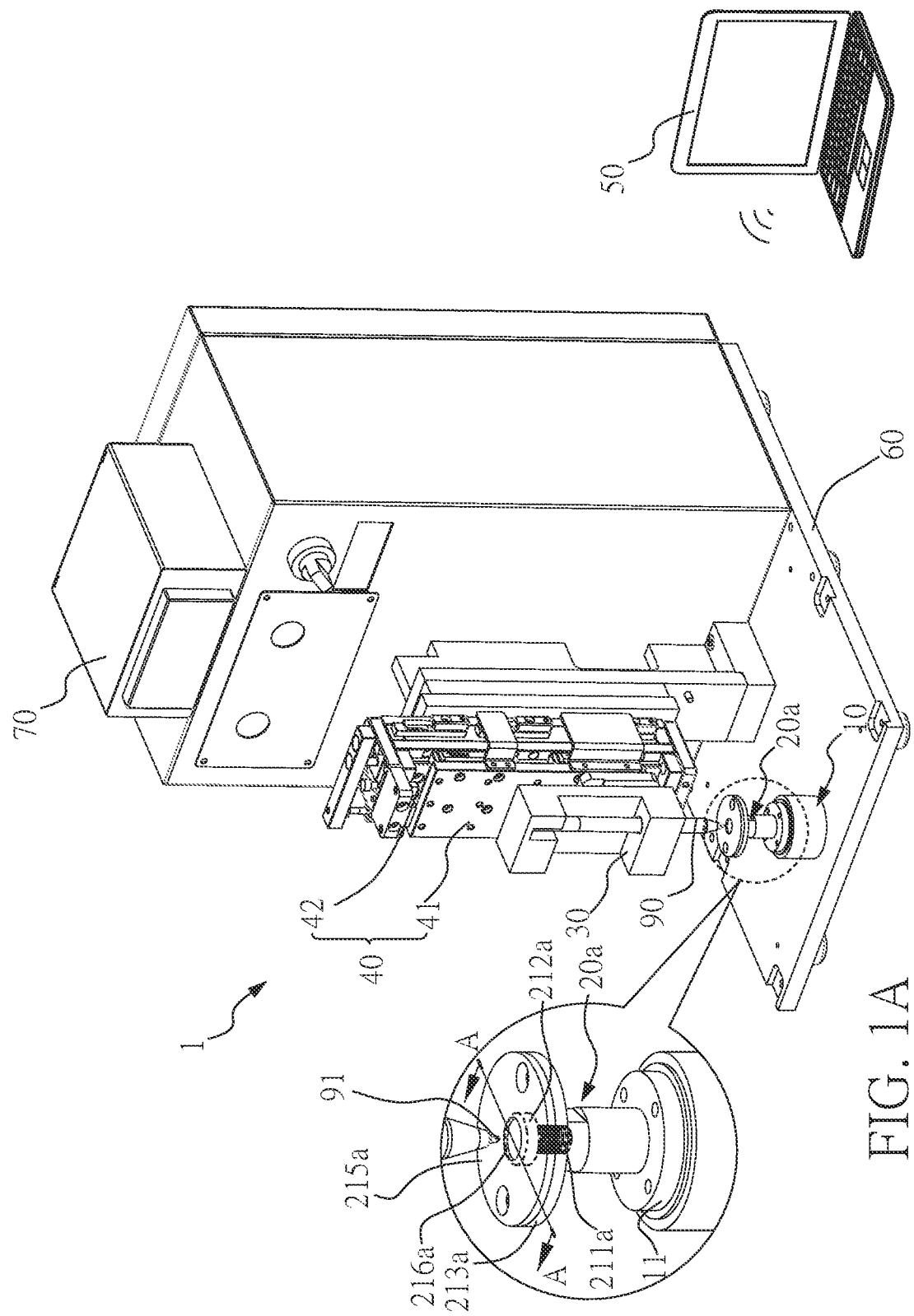
FIG. 1A illustrates a schematic view and a partially enlarged schematic view of an object press performance measuring system with the first embodiment of the elastic assembly of the present invention.

In order to make the structure and characteristics as well as the effectiveness of the present invention to be further understood and recognized, the detailed description of the present invention is provided as follows along with embodiments and accompanying figures. Hereinafter, please refer to FIGS. 1A, 1B, and 2 to 4 for the schematic view and partially enlarged schematic view of the object press performance measuring system with the first embodiment of the elastic assembly of the present invention, the cross-sectional view of the line AA in FIG. 1A, a curve view of a pressure value and a moving distance of the object to be measured which is measured by using the object press performance measuring system; a partial explosive schematic view of an embodiment of the object press performance measuring system; and a schematic view of an embodiment of the object press performance measuring system.

A shown in FIGS. 1A, 1B, and 2 to 4, in this embodiment, an object press performance measuring system 1 comprises a measuring unit 10, an elastic assembly 20a, a moving fixture 30, a driving device 40, a control unit 50, a base plate 60, and a digital display 70, wherein the measuring unit 10 is an electronic scale, a pressure sensor, or a load cell, the elastic assembly 20a is disposed between an object to be measured 90 and the measuring unit 10, the moving fixture 30 carries the object to be measured 90, the driving device 40 is connected to the moving fixture 30, the control unit 50 is signally connected to the measuring unit 10 and the driving device 40, the base plate 60 carries the measuring unit 10, the digital display 70 is signally connected to the measuring unit 10 and the control unit 50. The control unit 50 of this embodiment is a computer, and the control unit 50 controls the driving device 40 to drive the moving fixture 30 to move along the moving direction of the object to be measured 90 until the measuring unit 10 measures a pressure value of the object to be measured 90, and displays the pressure value through the digital display 70, and the control unit 50 receives the pressure value measured by the measuring unit 10. When the measuring unit 10 measures the pressure value, the control unit 50 receives the pressure value and records the moving distance of the moving fixture 30 corresponding to the pressure values. It is noted that, according to an embodiment of the present invention, the object to be measured 90 is a stylus, and the pressure value measured by the measuring unit 10 is the pressure sensitivity value of the stylus (pressure under the pen tip). It is noted that, the moving direction refers to a gravity direction of the object to be measured.

Figure 1B:
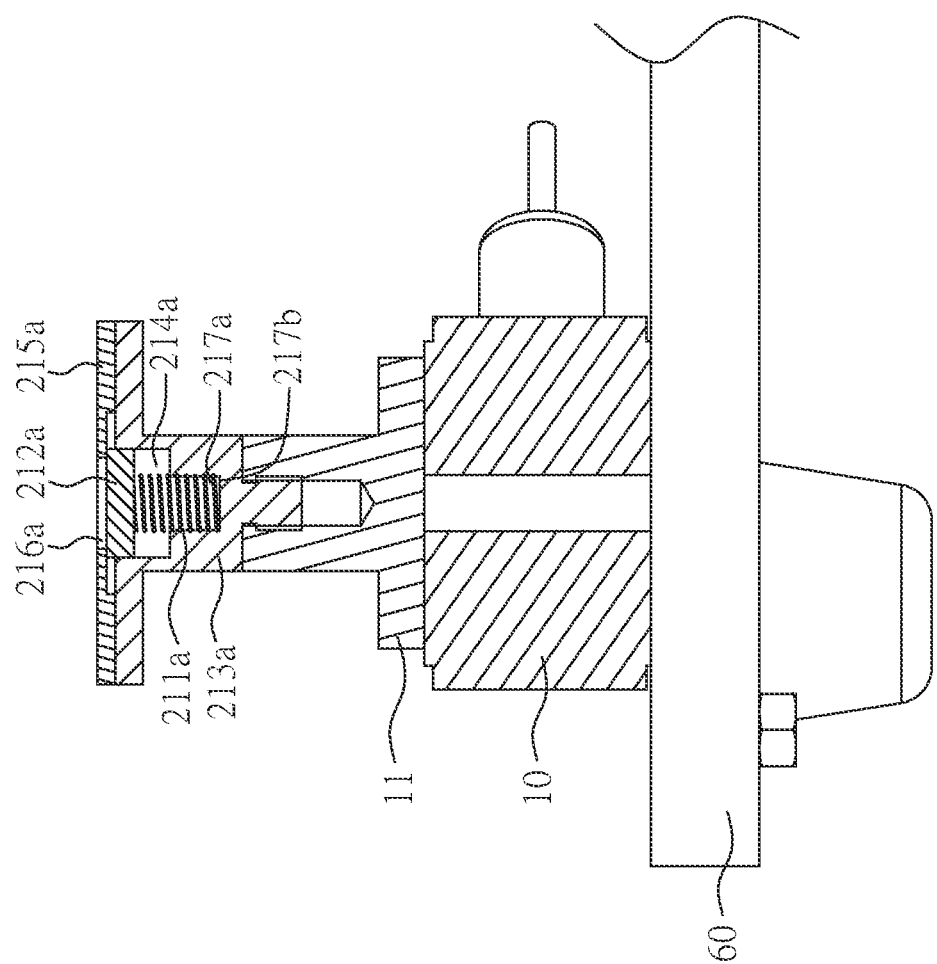
FIG. 1B illustrates a cross-sectional view of the line A-A in FIG. 1A.
Figure 2:
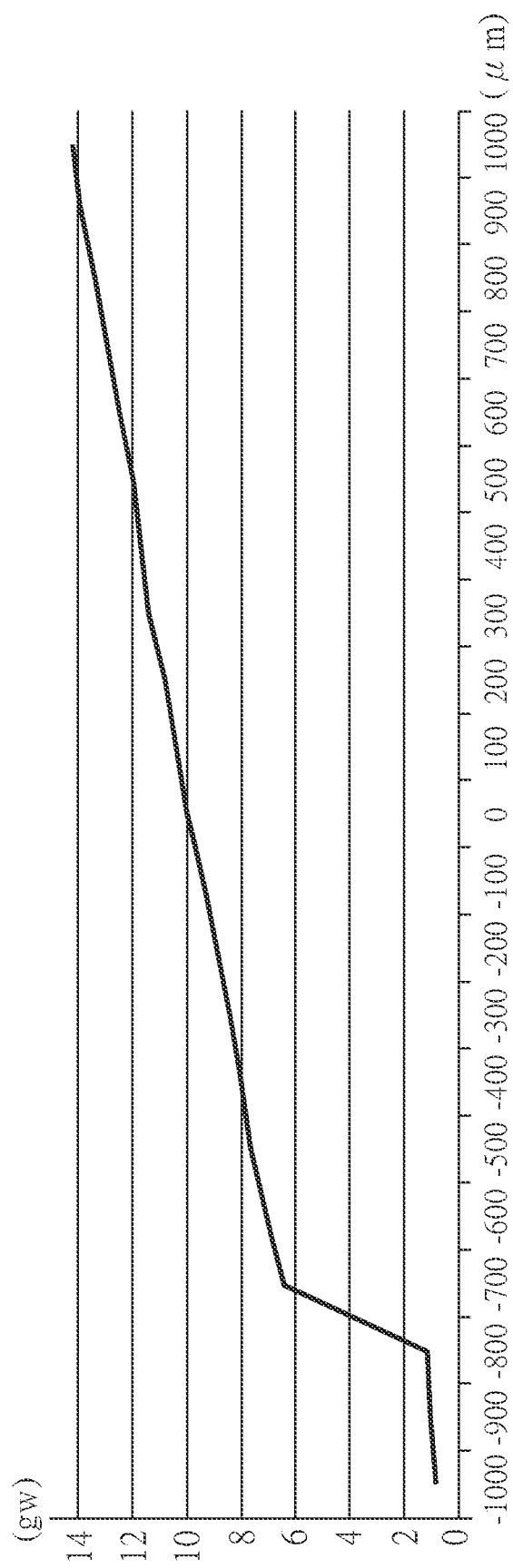
FIG. 2 illustrates a curve view of a pressure value and a moving distance of the object to be measured which is measured by using the object press performance measuring system of the present invention.
Figure 3:
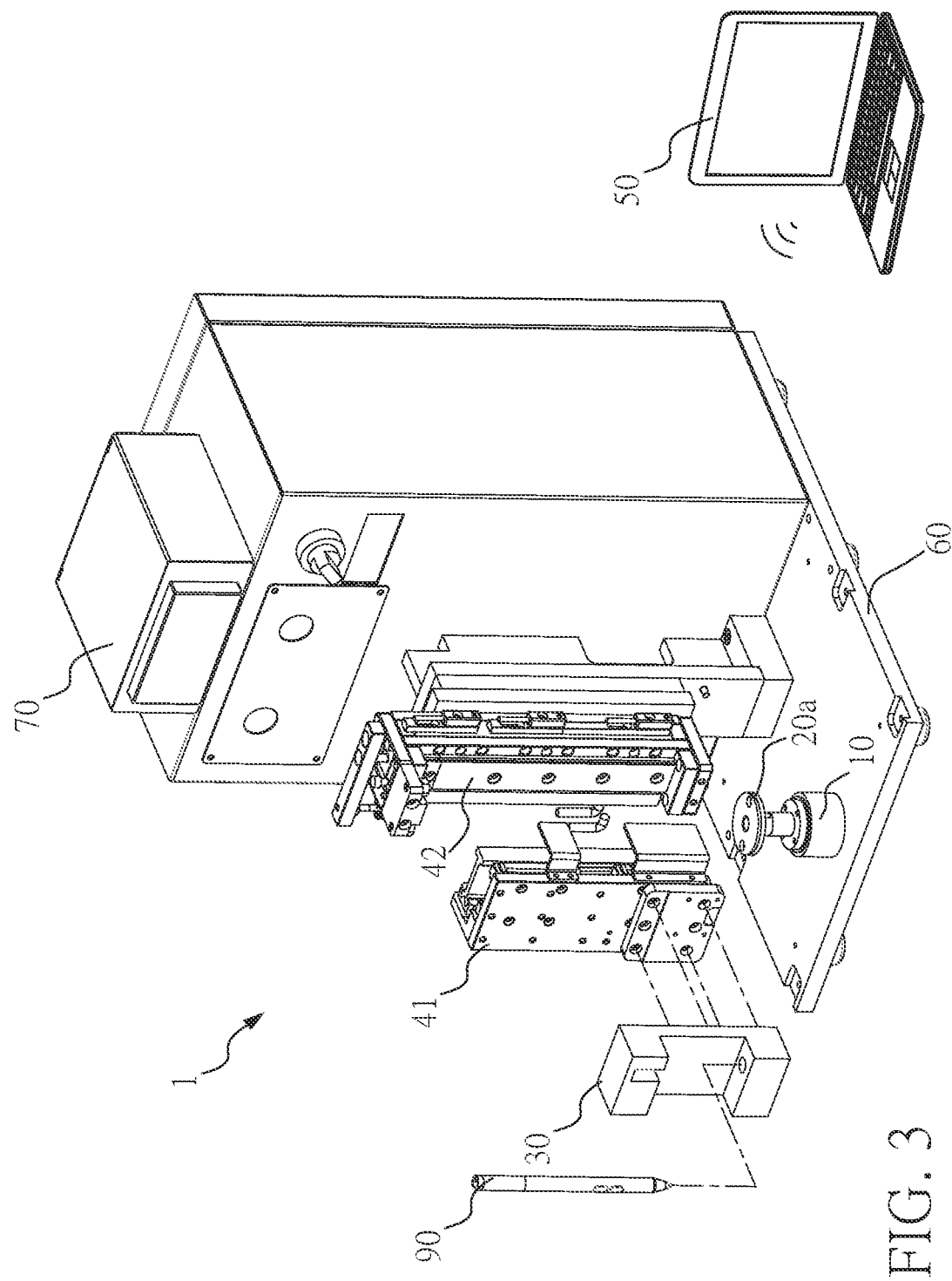
FIG. 3 illustrates a partial explosive schematic view of an embodiment of the object press performance measuring system of the present invention.
Figure 4:
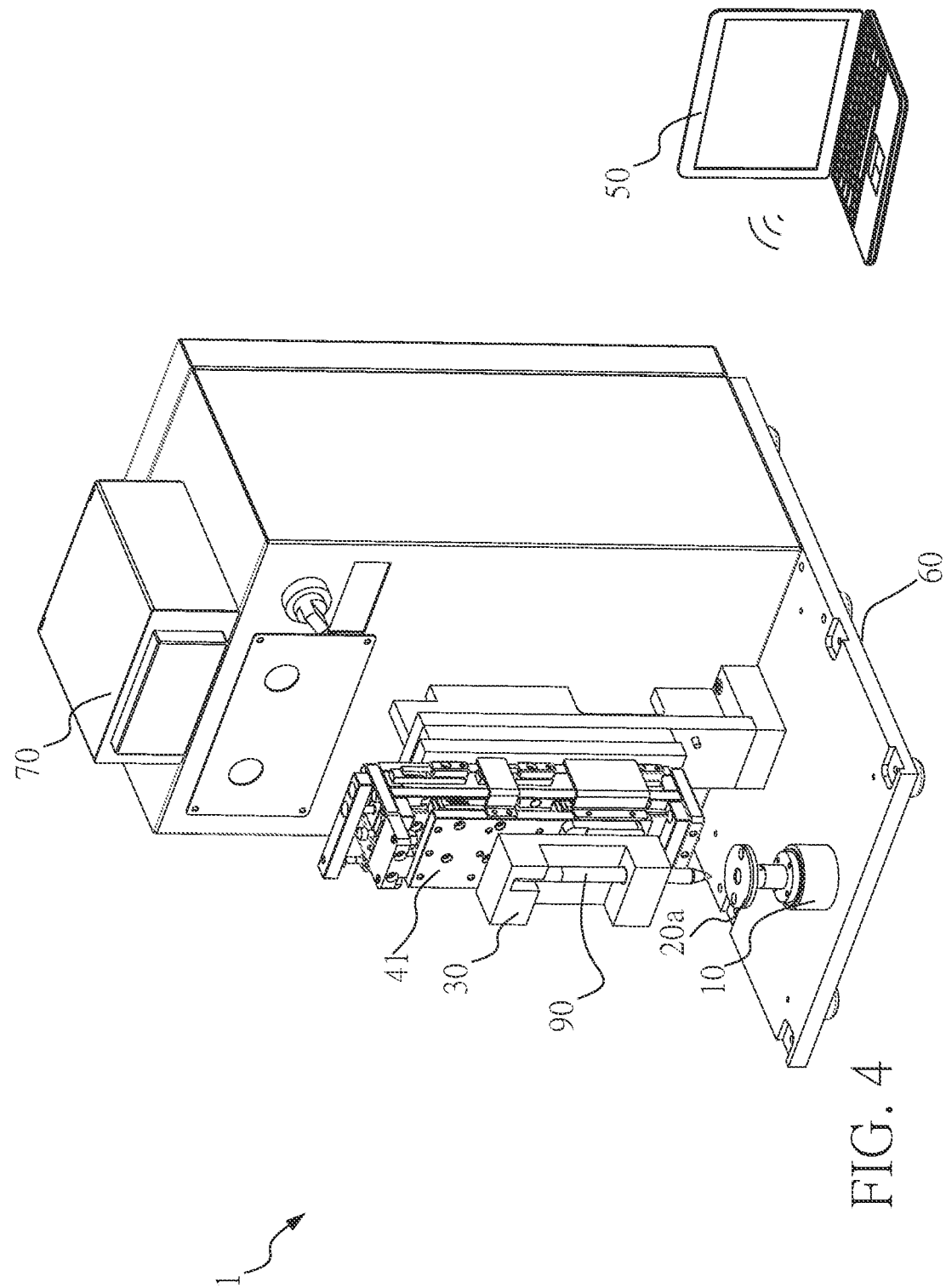
FIG. 4 illustrates a schematic view of an embodiment of the object press performance measuring system of the present invention.

As shown in FIGS. 1A, 1B, and 2, in this embodiment, when the object to be measured 90 moves along its own moving direction to be in contact with the elastic assembly 20a, the elastic assembly 20a provides buffer to allow the measuring unit 10 to measure a pressure value less than the gravity of the object to be measured 90. For example, if the object to be measured 90 weights 20 grams (gw), then a pressure value of the object to be measured 90 below 20 grams (gw) can be obtained by using the elastic assembly 20a. As shown in FIG. 1A and FIG. 1B, in this embodiment, the elastic assembly 20a includes an first elastic unit 211a, an actuating element 212a, a first housing 213a, and a cover body 215a, wherein the first elastic unit 211a is a spring situated within the first housing 213a and abuts between the actuating element 212a and the measuring unit 10, the actuating element 212a is in the shape of a flat plate, and the first housing 213a accommodates the first elastic unit 211a and the actuating element 212a. In this embodiment, the first housing 213a includes a first accommodating groove 214a and a second accommodating groove 217a, wherein the second accommodating groove 217a is beneath the first accommodating groove 214a and; the two ends of the first elastic unit 211a touches the actuating element 212a and the second accommodating groove 217a respectively. The first elastic unit 211a and the actuating element 212a are accommodated in the accommodating groove 214a, and the cover body 215a covers the first housing 213a, the first elastic unit 211a and the actuating element 212a. The design of the accommodating groove 214a can limit the amount of compression of the first elastic unit 211a to avoid excessive compression of the first elastic unit 211a. The cover body 215a has an opening 216a on one side closer to the object to be measured 90. Specifically, the aperture formed by the opening 241 of the cover body 215a is smaller than the outer diameter of the actuating element 212a so that when the pressure of the first elastic unit 211a is released (not being measured), the actuating element 212a is elastically moved by the first elastic unit 211a to be stopped at the opening 216a. Since the aperture of the opening 216a is smaller than the outer diameter of the actuating element 212a, it can also prevent the actuating element 212a from being released from the first housing 213a after the pressure of the first elastic unit 211a is released (not being measured). When the object to be measured 90 approaches the measuring unit 10 along the moving direction, the tip 91 of the object to be measured 90 passes through the opening 216a to be in contact with the actuating element 212a, at this time, the object to be measured 90 is in contact with the first elastic unit 211a and the measuring unit 10 through the actuating element 212a, and the first elastic unit 211a is used as an buffer to assist the measuring unit 10 to measure a pressure value less than the weight of the object to be measured 90 (as shown in FIG. 2). In this embodiment, the top surface of the first housing 213a and the cover body 215a both further include a plurality of openings, which are secured to the top of the first housing 213a by screws passing through the opening of the cover body 215a. In some embodiments, the cover body 215a and the first housing 213a can also be fixed by other means, such as a snap structure, but it is not limited thereto.

In this embodiment, the second accommodating groove 217a provides a first receiving surface 217b for the first elastic unit 211a. In particular, one end of the first elastic unit 211a is constrained in the second accommodating groove 217a and touches the first receiving surface 217b. As such, when the measuring procedure begins, the first elastic unit 211a is being pressed and deformed along the moving direction of the object to be measured 90 smoothly until the first elastic unit 211a completely accommodated within the second accommodating groove 217a.

In this embodiment, as shown in FIG. 2 and table 1, in using the object press performance measuring system 1 of the present invention, after the measuring unit 10 obtains the pressure value of the object to be measured 90, with the design of the elastic assembly 20a, the measuring unit 10 can accurately reflect the increase in the moving distance of the object to be measured 90, and the slight change in the pressure value of the object to be measured 90, this is due to the fact that the object to be measured 90 is first in contact with the elastic assembly 20a, and is then in contact with the measuring unit 10 through the elastic assembly 20a. In doing so, this reduces the contact force generated when the tip 91 of the object to be measured 90 is in contact with the measuring unit 10 and can help slow down the upward trend of the pressure curve as shown in FIG. 2, thereby obtaining the pressure value less than the gravity of the object to be measured 90. Therefore, the present invention solves the problem that when the object to be measured 90 directly touches the measuring unit 10, the gravity of the object to be measured 90 is directly transferred to the measuring unit 10 and the pressure value less than the gravity of the object to be measured 90 cannot be measured.

In addition, as shown in Table 1, by controlling the moving distance of the object to be measured 90, the object press performance measuring system 1 of the present invention can accurately measure the target pressure value of the object to be measured 90 to increase the applicability of the present invention. It is noted that according to a preferred embodiment of the present invention, the measuring unit 10 includes a connecting element 11, wherein the elastic assembly 20a is detachably connected to the measuring unit 10 through the connecting element 11. Specifically, the elastic assembly 20a can be assembled and fixed to the connecting element 11 by a method such as clamping, and the connecting element 11 is fixed to the measuring unit 10 in a locking manner. In some embodiments, the connecting element 11 may be a screw hole. The elastic assembly 20a and the connecting element 11 are connected with each other through a thread. The connection between the screw hole and the thread allows the elastic assembly to be detachably connected to the measuring unit 10, so that the elastic assemblies 20, 20a having different elastic coefficients can be replaced to measure different target pressure values. In some embodiments, the first housing 213a and the connecting element 11 may be in one piece, but it is not limited thereto. Therefore, the object press performance measuring system 1 of the present invention can change the elastic coefficient of the first elastic unit 211a as required to measure different pressure values of the object to be measured 90. For example, if the measured pressure value of the object to be measured 90 is 300 grams (gw), a first elastic unit 211a with high elastic coefficient can be used. If the measured pressure value of the object to be measured 90 is 3 grams (gw), a first elastic unit 211a with a low elastic coefficient can be used.

TABLE 1 using the object press performance measuring system of the present invention with the first embodiment of the elastic assembly to obtain data of the object to be measured.
Object to be measured 90
Measurement

| Distance (μm) | Weight (gw) |
| --- | --- |
| −1000 μm | 0.9 |
| −900 μm | 1.1 |
| −800 μm | 1.2 |
| −700 μm | 6.6 |
| −600 μm | 7.1 |
| −500 μm | 7.6 |
| −400 μm | 8 |
| −300 μm | 8.4 |
| −200 μm | 8.9 |
| −100 μm | 9.4 |
| 0 μm | 10 |
| 100 μm | 10.4 |
| 200 μm | 10.8 |
| 300 μm | 11.4 |
| 400 μm | 11.7 |
| 500 μm | 12 |
| 600 μm | 12.5 |
| 700 μm | 12.9 |
| 800 μm | 13.4 |
| 900 μm | 13.9 |
| 1000 μm | 14.2 |

In some embodiments, when the target pressure value of 10 gram weight (gw) is reached, the present invention further uses 10 gram weight (gw) as a unit basis of 0 (μm), and moves the object to be measured 90 up a distance in the moving direction (a negative value is marked when going upward) or down a distance (a positive value when downward). By controlling the object to be measured 90, a single increment of 100 (μm) of moving distance is used to measure the weight to provide the tolerance range data of the pressure value. On the other hand, without the buffer from the elastic assembly 20a, the object to be measured 90 will be directly in contact with the measuring unit 10, at this time, the weight of the object to be measured 90 will be completely pressed on the measuring unit 10, and the measuring unit 10 cannot measure a pressure value less than the gravity of the object to be measured 90, and cannot achieve the function of measuring small changes in the pressure value of the object to be measured 90 as the moving distance of the object to be measured 90 increases.

As shown in FIGS. 1A, 1B, 3, and 4, the driving device 40 of the present invention includes a sliding block 41, a guide rail 42, and a driving motor (not shown in figure), a control unit 50 includes a programming system, and a moving fixture 30 is disposed on the sliding block 41. The control unit 50 controls the drive motor to drive the sliding block 41 to move up and down along the moving direction of the object to be measured 90 relative to the guide rail 42 so that the measuring unit 10 can measure the pressure value of the object to be measured 90. In other words, by controlling the moving distance of the object to be measured 90 relative to the measuring unit 10 by the control unit 50, the measuring unit 10 can obtain the slightly changes of the pressure value of the object to be measured 90 until the pressure value of the object to be measured 90 reaches a target pressure value (for example: 10 gw), at this time, the control unit 50 receives the target pressure value and records the moving distance of the moving fixture 30 corresponding to the target pressure value, and uses the programming system to program data of the object to be measured 90 at 10 gw and other related data into the control chip of the object to be measured 90. According to a preferred embodiment of the present invention, the target pressure value is ranged between 10 grams weight (gw) to 350 grams weight (gw), but it is not limited thereto. In summary, according to the configuration of the elastic assembly of the object press performance measuring system of the present invention, the measuring unit can accurately reflect the increase in the moving distance of the object to be measured, and also the small changes in the pressure value, thereby allowing the measuring unit to measure a pressure value less than the gravity of the object to be measured. The object press performance measuring system 1 of the present invention is designed to allow the manufacturer of the object to be measured 90 to obtain the pressure value less than the weight of the object to be measured 90 to meet the requirement of the client, thereby improving the accuracy and production efficiency of programming and manufacturing these kinds of objects.

Please refer to FIGS. 5 to 9 for the illustration of the object press performance measuring system with the second embodiment of the elastic assembly of the present invention, the explosive schematic view of the second embodiment of the elastic assembly of the present invention, the section view illustrating the second embodiment of the elastic assembly of the present invention before the first measuring travel begins, the section view illustrating the second embodiment of the elastic assembly of the present invention when the first measuring travel ends, and the section view illustrating the second embodiment of the elastic assembly of the present invention when the second measuring travel ends. It is noted that, the object press performance measuring system of the present invention in this embodiment is same as the object press performance measuring system in the abovementioned embodiment except of the elastic assembly 20 and the duplicated parts are omitted and the derailed description of the elastic assembly 20 is presented below.

Figure 5:
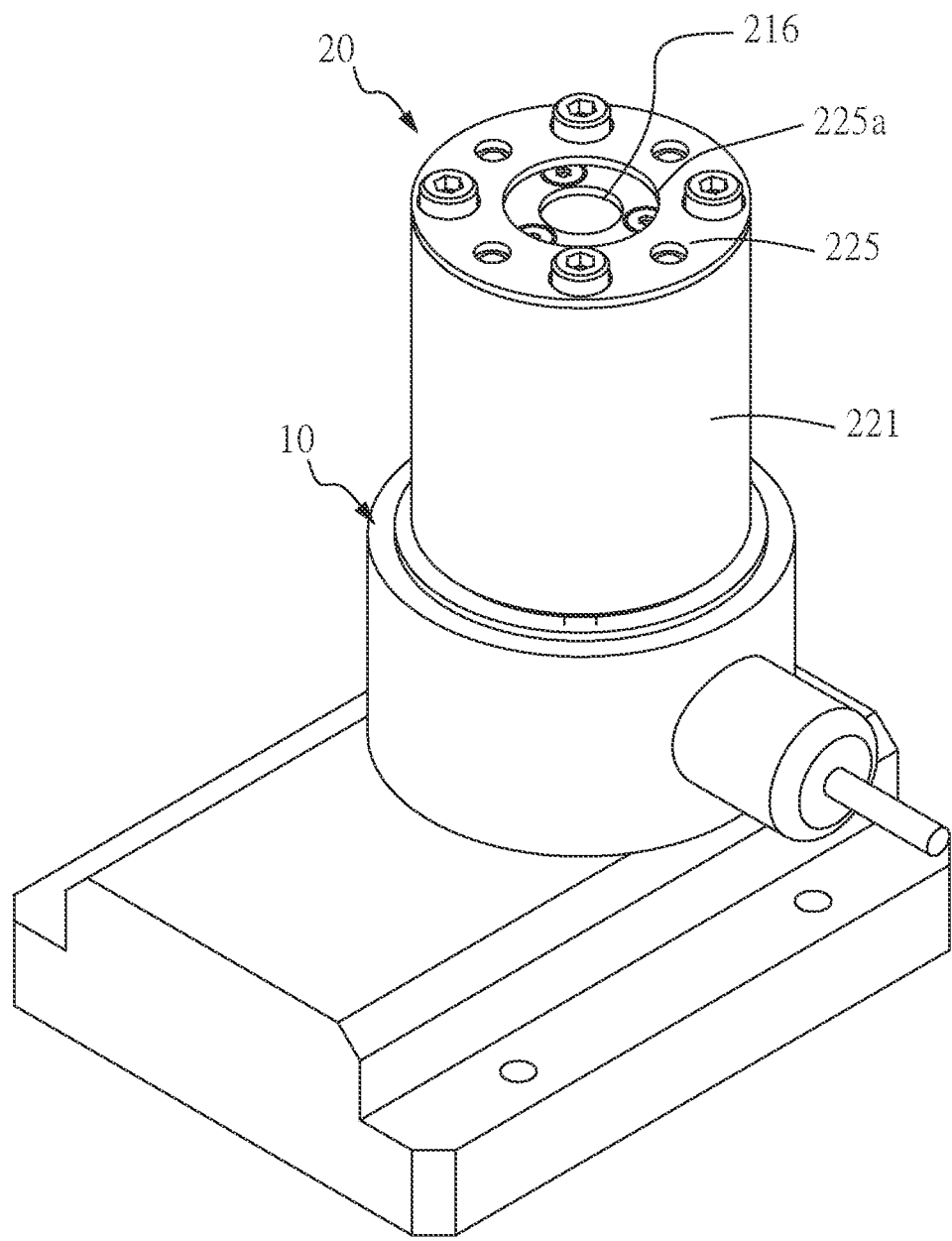
FIG. 5 illustrates the object press performance measuring system with the second embodiment of the elastic assembly of the present invention.
Figure 6:
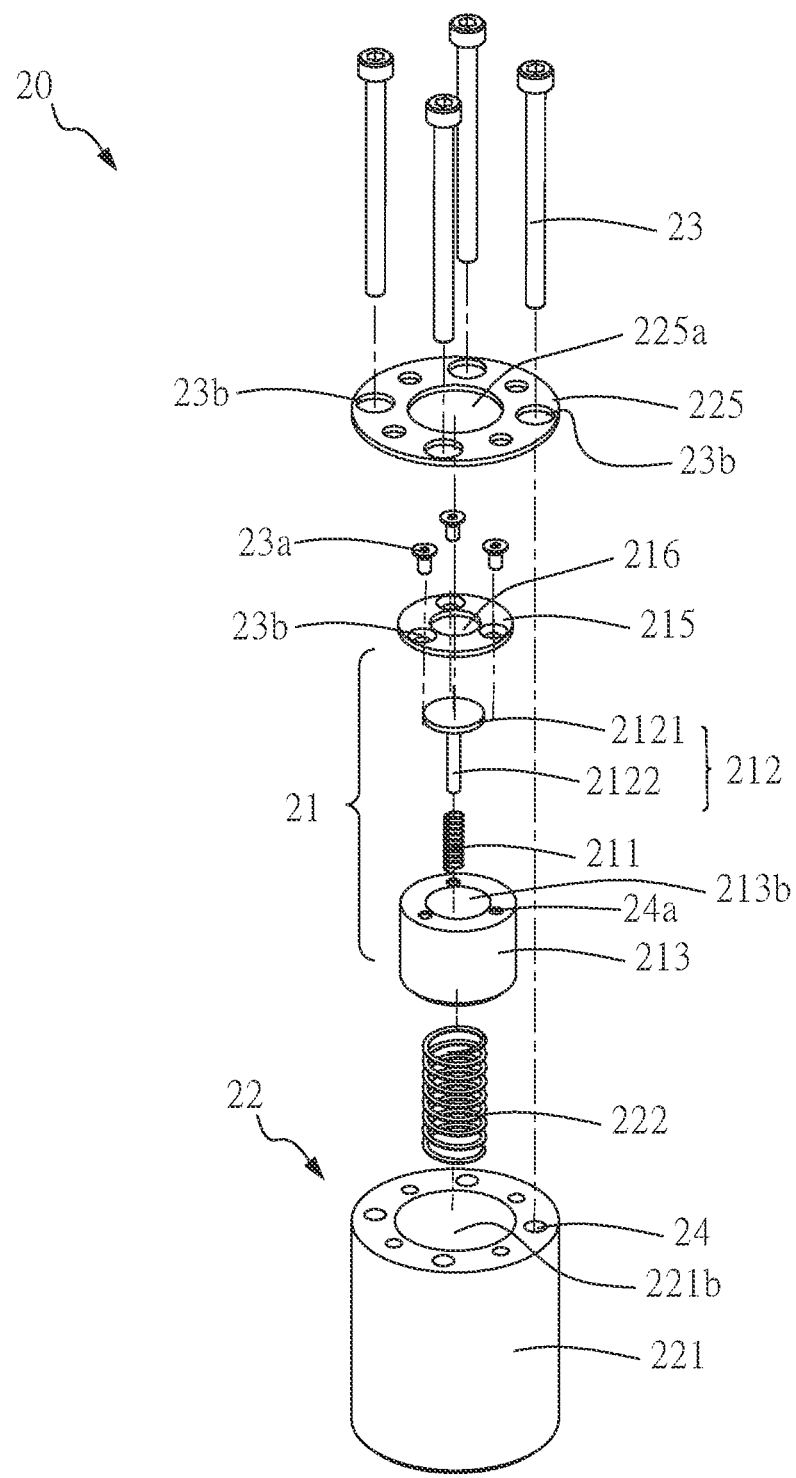
FIG. 6 illustrates an explosive schematic view of the second embodiment of the elastic assembly of the present invention.

As shown in FIGS. 5 and 6, in this embodiment, the elastic assembly 20 includes a first assembly 21 and a second assembly 22, wherein the first assembly 21 performs performing a first measuring travel of the object to be measured 90 and to measure the pressure value less than 30 gw. The second assembly 22 is disposed between the first assembly 21 and the measuring unit 10. The second assembly 22 performs a second measuring travel of the object to be measured 90, wherein the second measuring travel refers to measure the pressure value greater than 30 gw. It is noted that, the present invention is not limited the abovementioned embodiment, the pressure value measured in the second measuring travel is greater than the pressure value measured in the first measuring travel is sufficient.

Figure 7:
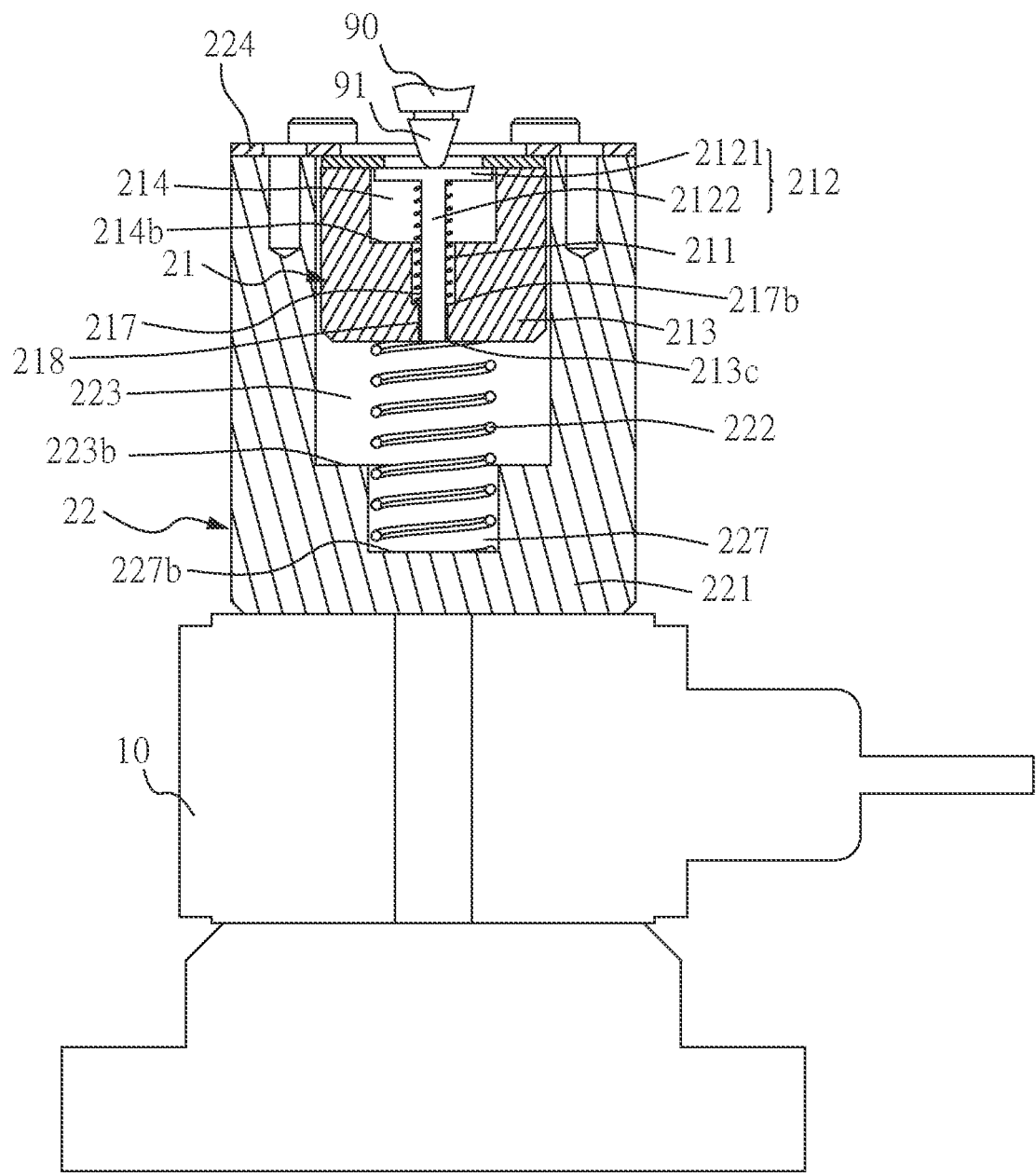
FIG. 7 is a section view illustrating the second embodiment of the elastic assembly of the present invention before the first measuring travel begins.
Figure 8:
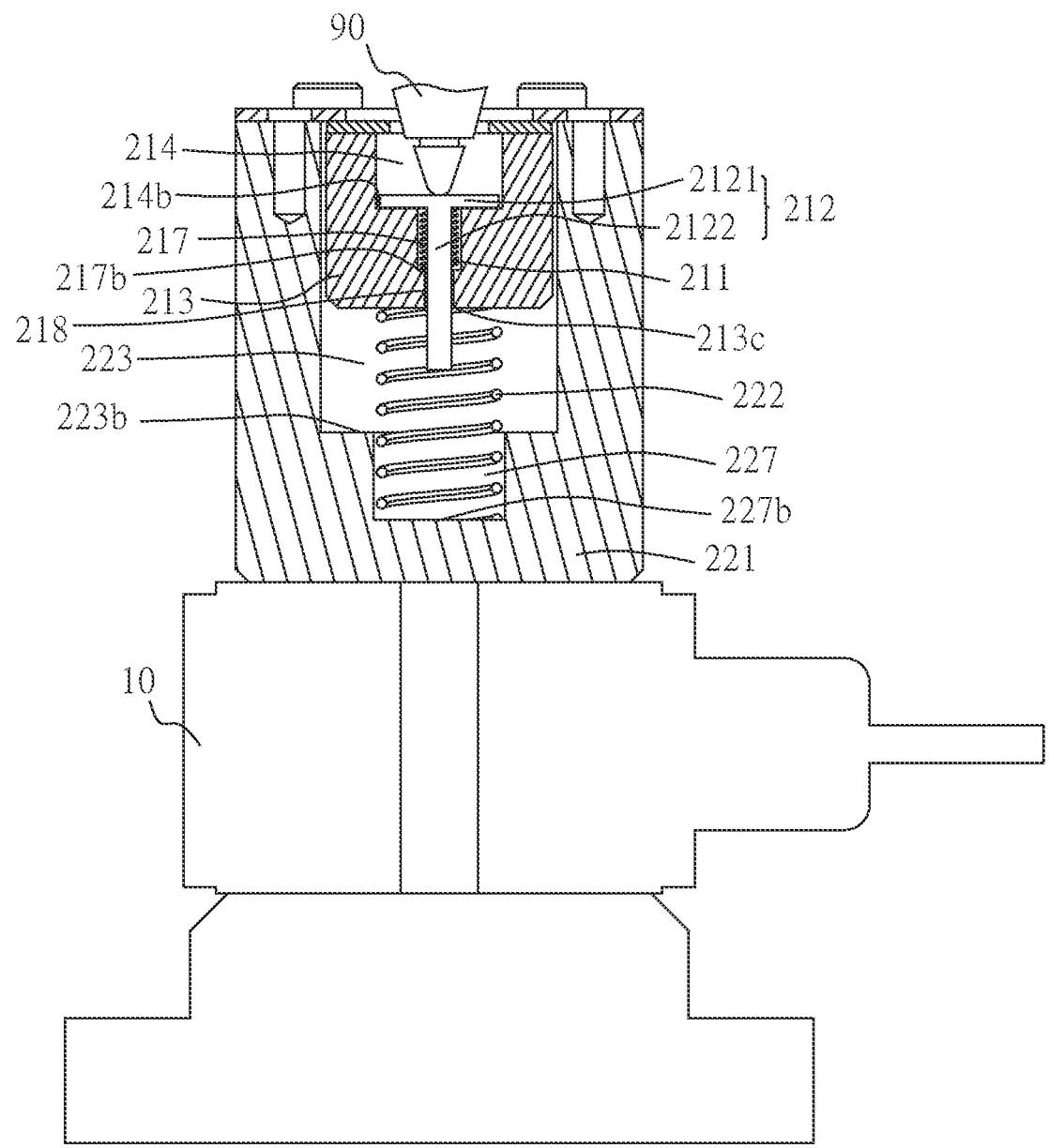
FIG. 8 is a section view illustrating the second embodiment of the elastic assembly of the present invention when the first measuring travel ends.

As shown in FIGS. 6 and 7, the first assembly 21 includes a first elastic unit 211, an actuating element 212, a first housing 213, and a first cover body 215, wherein the first elastic 211 and the actuating element 212 are accommodating in the first housing 213. The first housing 213 has a first accommodating groove 214, a second accommodating groove 217 and a third accommodating groove 218. Two ends of the first elastic 211 contacts the actuating element 212 and the second accommodating groove 217, respectively and the object to be measured 90 touches the first elastic unit 211 via the actuating element 212. The first cover body 215 covers the first housing 213, the first elastic unit 211 and the actuating element 212. As shown in FIGS. 7 and 8, before the first measuring travel begins, the first elastic unit 211 is not being pressed and contacts with the actuating element 212 for allowing the actuating element 212 to contact with the cover body 215. When the object to be measured 90 moves along its moving direction and the tip 91 of the object to be measured 90 touches the actuating element 212, the first measuring travel begins. In the first measuring travel, the actuating element 212 moves along the moving direction of the object to be measured 90 inside and relative to the first housing 213 for continuously pressing the first elastic unit 211 until the first elastic unit 211 completely accommodates within the second accommodating groove 217.

As shown in FIG. 6 and FIG. 7, the first accommodating groove 214, the second accommodating groove 217 and the third accommodating groove 218 are situated within the first housing 213 from top to bottom along an axis. In particular, the second accommodating groove 217 and the first accommodating groove 214 are aligned to each other along the axis of the moving direction of the object to be measured 90; the second accommodating groove 217 and the third accommodating groove 218 are aligned to each other along the axis of the moving direction of the object to be measured 90. The first accommodating groove 214 communicates with the second accommodating groove 217 and the second accommodating groove 217 communicates with the third accommodating groove 218. A size of an aperture of the first accommodating groove 214 is greater than the size of an aperture of the second accommodating groove 217; the size of an aperture of the third accommodating groove 218 is smaller than the size of an aperture of the second accommodating groove 217. In this embodiment, the first accommodating groove 214 is exposed to a top end of the first housing 213 to form a first opening 213b, the first cover body 215 has a hole 216 near the object to be measured 90 and the first cover body 215 covers the first opening 213b. In this embodiment, both the top end of the first housing 213 and the first cover body 215 have a plurality of through holes 23b in an annular alignment. By using the screws 23a passing through holes 23b, the first cover body 215 is fixed to the top end of the first housing 213. In some embodiments, the first cover body 215 and the first housing 213 can also be fixed by other means, such as a snap structure, but it is not limited thereto.

As shown in FIG. 6 and FIG. 7, in this embodiment, the actuating element 212 comprises a pressing plate 2121 and a connection post 2122. The connection post 2122 situates beneath the pressing plate 2121 and the first elastic unit 211 encircles the connection post 2122. The pressing plate 2121 disposes on one end of the connection post 2122 and contacts with one end of the first elastic unit 211. Another end of the first elastic unit 211 contact with the first receiving surface 217b of the second accommodating groove 217 for allowing the actuating element 212 to move relative to the first housing 213 and then to press the first elastic unit 211. In this embodiment, another end of the connection post 2122 is movably accommodated in the third accommodating groove 218. As such, the connection post 2122 is guided by the third accommodating groove 218 to steadily move relative to the first housing 213. Therefore, the offset of the actuating element 212 is avoided.

As shown in FIG. 7 and FIG. 8, in this embodiment, the first accommodating groove 214 provides a first arrival surface 214b for the actuating element 212. In particular, the actuating element 21 is accommodated within the first accommodating groove 214 and the pressing plate 2121 is movably constrained in the first accommodating groove 214. When the first measuring travel begins, the pressing plate 2121 of the actuating element 212 moves inside and relative to the first housing 213 for continuously pressing the first elastic unit 211 until the pressing plate 2121 touches the first arrival surface 214b. In other words, the first measuring travel refers to the movement that the pressing plate 2121 moves from the top end of the first housing 213 to the first arrival surface 214b of the first accommodating groove 214. In addition, when the pressing plate 2121 moves and then touches the first arrival surface 214b of the first accommodating groove 214, the first elastic unit 211 is being pressed and accommodated within the second accommodating groove 217.

In this embodiment, the second accommodating groove 217 provides a first receiving surface 217b for the first elastic unit 211. In particular, one end of the first elastic unit 211 is constrained in the second accommodating groove 217 and contacts with the first receiving surface 217b. As such, when the first measuring travel begins, the first elastic unit 211 is being pressed and deformed along the moving direction of the object to be measured 90 smoothly until the first elastic unit 211 completely accommodated within the second accommodating groove 217.

According to an embodiment of the present invention, the actuating element 212 is T-shape and the pressing plate 2121 and the connection post 2122 are integrally formed. However, the present invention is not limited to this embodiment. As shown in FIG. 7 and FIG. 8, the size of an aperture of the third accommodating groove 218 matches the size of an aperture of the connection post 2122. Therefore, the connection post 2122 is movably constrained within the third accommodating groove 218 for ensuring the object to be measured 90 to move along the moving direction relative to the first housing 213 smoothly when the first measuring travel begins. The third accommodating groove 218 is exposed to the bottom end of the first housing 213 to form a second opening 213c. When the actuating element 212 moves along the gravity direction, the end of the connection post 2122 situated within the third accommodating groove 218 is passing through the second opening 213c of the first housing 213; however, the present invention is not limited to this embodiment. In some embodiments, the length of the connection post 2122 depends on the design requirement. For example, the connection post 2122 can be accommodated in the first accommodating groove 214 or the second accommodating groove 217; the first accommodating groove 214 or the second accommodating groove 217 are capable of constraining and guiding the connection post 2122. In other words, one end of the connection post 2122 does not partially pass through the second opening 213c.

As shown in FIG. 6, the second assembly 22 comprises a second housing 221, a second elastic unit 222, and a second cover body 225, wherein the second elastic unit 222 and the first assembly 21 are accommodated in the second housing 221 and the second housing 221 includes a fourth accommodating groove 223 and a fifth accommodating groove 227. The fourth accommodating groove 223 situates above and communicates with the fifth accommodating groove 227. In particular, the first assembly 21 is accommodated within the fourth accommodating groove 223; the first assembly 21 is movably constrained within the fourth accommodating groove 223. The fourth accommodating groove 223 is aligned with the fifth accommodating groove 227 along an axis and the size of an aperture of the fourth accommodating groove 223 is greater than the size of an aperture of the fifth accommodating groove 227.

Figure 9:
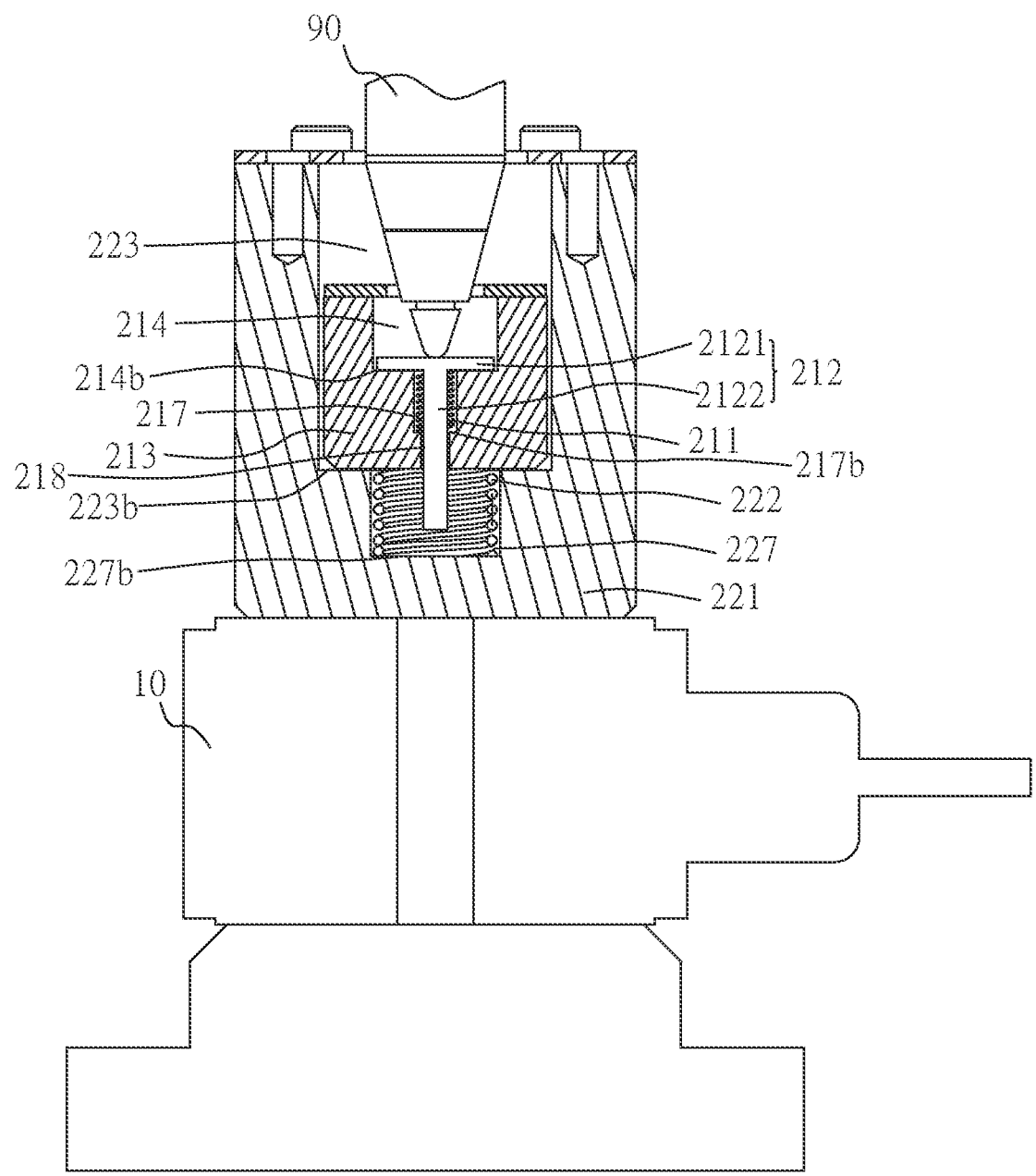
FIG. 9 is a section view illustrating the second embodiment of the elastic assembly of the present invention when the second measuring travel ends.

As shown in FIG. 7, the fourth accommodating groove 223 provides a second arrival surface 223b for the first assembly 21. Two ends of the second elastic unit 222 contacts with the bottom end of the first assembly 21 and the fifth accommodating groove 227 of the second housing 221. Before the second measuring travel begins, the second elastic unit 222 is not being pressed and one end of the second elastic unit 222 contacts with the bottom end of the first assembly 21 for allowing the first assembly 21 away from the second arrival surface 223b. As shown in FIGS. 8 and 9, when the second measuring travel begins, the first assembly 21 moves inside the fourth accommodating groove 223 and relative to second housing 221 for continuously pressing the second elastic unit 222 and then the first assembly 21 gradually being close to the second arrival surface 223b until the bottom end of the first assembly 21 touches the second arrival surface 223b.

In particular, as shown in FIGS. 8 and 9, after the second measuring travel begins, the actuating element 212 of the first assembly 21 is being pressed continuously by the object to be measured 90 and then leading the first assembly 21 to move inside the fourth accommodating groove 223 and relative to second housing 221 for continuously pressing the second elastic unit 222 until the bottom end of the first assembly 21 touches the second arrival surface 223b and the second elastic unit 222 is completely accommodated within the fifth accommodating groove 227. The fifth accommodating groove 227 provides a second receiving surface 227b for the second elastic unit 222. In particular, one end of second elastic unit 222 contacts with the bottom end of the first assembly 21 and another end of the second elastic unit 222 is accommodated within the fourth accommodating groove 223 and contacts with the second receiving surface 227b of fifth accommodating groove 227. As such, when the second measuring travel begins, the second elastic unit 222 is being pressed and deformed along the moving direction of the object to be measured 90 smoothly until the second elastic unit 222 is completely accommodated within the fifth accommodating groove 227. In this embodiment, the fourth accommodating groove 223 is exposed to the top end of the second housing 221 to form a third opening 221b and the second cover body 224 covers the third opening 221b.

As shown in FIG. 6, in this embodiment, the second cover body 225 has a plurality of through holes 23b and holes 225a in an annular alignment and the second housing 221 has a plurality of screw holes 24. The second cover body 225 and the second housing 221 can be fixed with each other by the stud 23 passing through the plurality of through holes 23b on the second cover body 225 and the elastic assembly 20 can be fixed on the measuring unit 10 consequently. In some embodiments, the second cover body 225 and the second housing 221 can also be fixed by other means, such as a snap structure, but it is not limited thereto.

According to an embodiment of the present invention, because the first assembly 21 performs a measurement of the target pressure value less than 30 gw and the second assembly 22 performs a measurement of the target pressure value greater than 30 gw, the elastic coefficient of the second elastic unit 222 is greater than an elastic coefficient of the first elastic unit 211 and the size of an aperture of the second elastic unit 222 is greater than the size of the aperture of the first elastic unit 211. As such the first elastic unit 211 and the second elastic unit 222 can operate independently for preventing the interference with each other. By the configuration of applying the T-shaped actuating element 212 and the first elastic unit 211 to the central axis of the elastic assembly 20, the object to be measured 90 is being positioned at the central axis of the elastic assembly 20 consequently and also the actuating element 212 can be constrained and guided by the accommodating grooves in the elastic assembly 20 to prevent the offset or warping occurs during the movement of the object to be measured 90. When the object to be measured 90 leaves the elastic assembly 20, the first elastic 211 bounces back and leading the actuating element 212 moves upward and backs to its initiated position (as shown in FIG. 7). The second elastic unit 222 of the second assembly 22 bounces back and leading the first assembly 21 back to its initiated position.

In some embodiments, the second assembly 22 can be detachable fastening or engaged with the first assembly 21 for changing the first assembly 21 or the second assembly 22 according to the different measuring travels of different the objects to be measured 90.

In some embodiments, the elastic assembly 20 can includes multiple assemblies for performing multiple measuring travels of the object to be measured 90 to measure multiple sections of pressure values. For example, the elastic assembly can further includes a third elastic assembly whose structure is similar to the second assembly; i.e. the third elastic assembly comprises the said housing and the said elastic unit and the said elastic unit is accommodated in the said housing.

Figure 10:
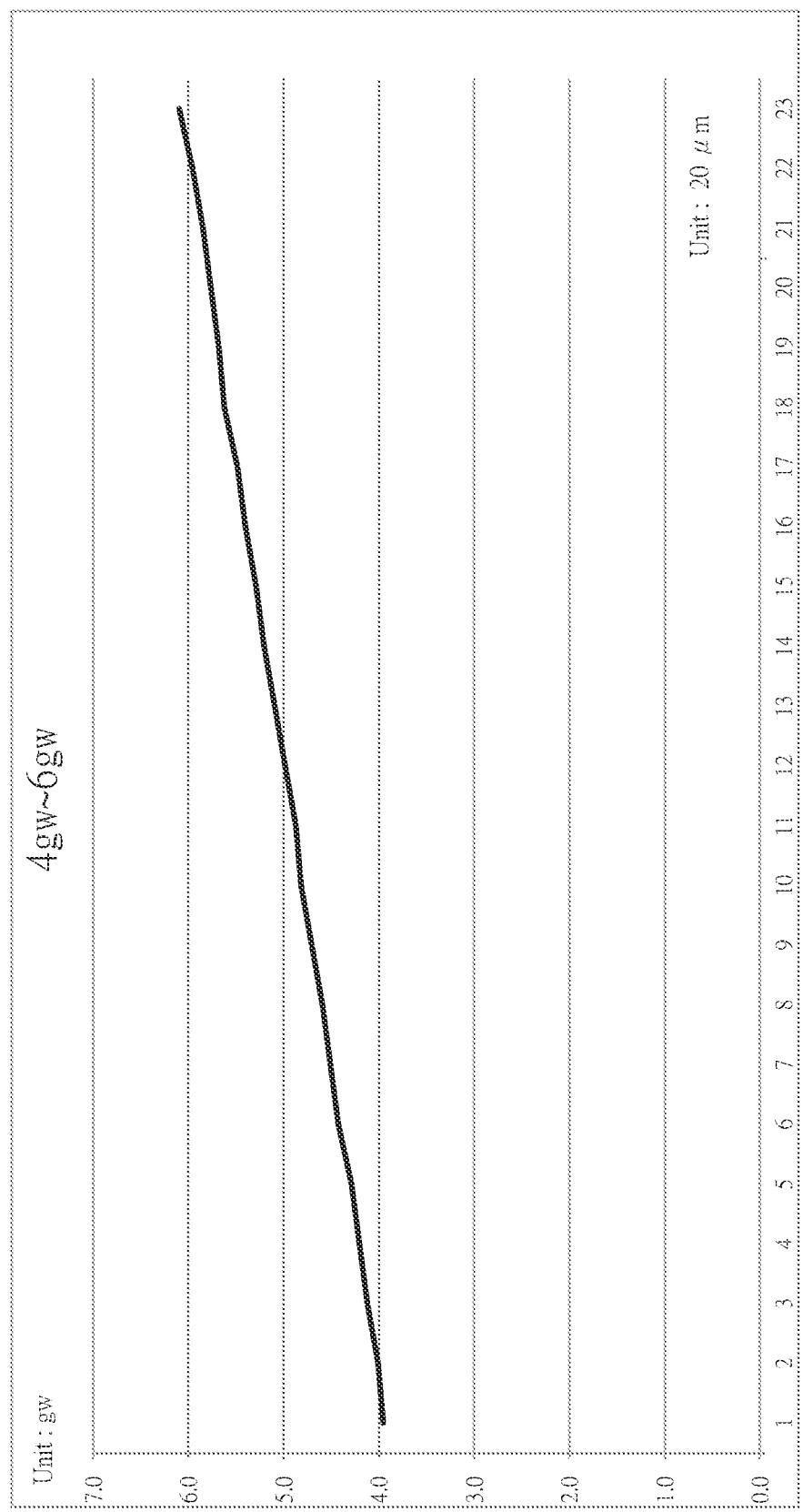
FIG. 10 illustrates a curve view of a pressure value and a moving distance of the object to be measured which the pressure values are between 4 gw and 6 gw and measured by using the object press performance measuring system with the second embodiment of the elastic assembly of the present invention.
Figure 11:
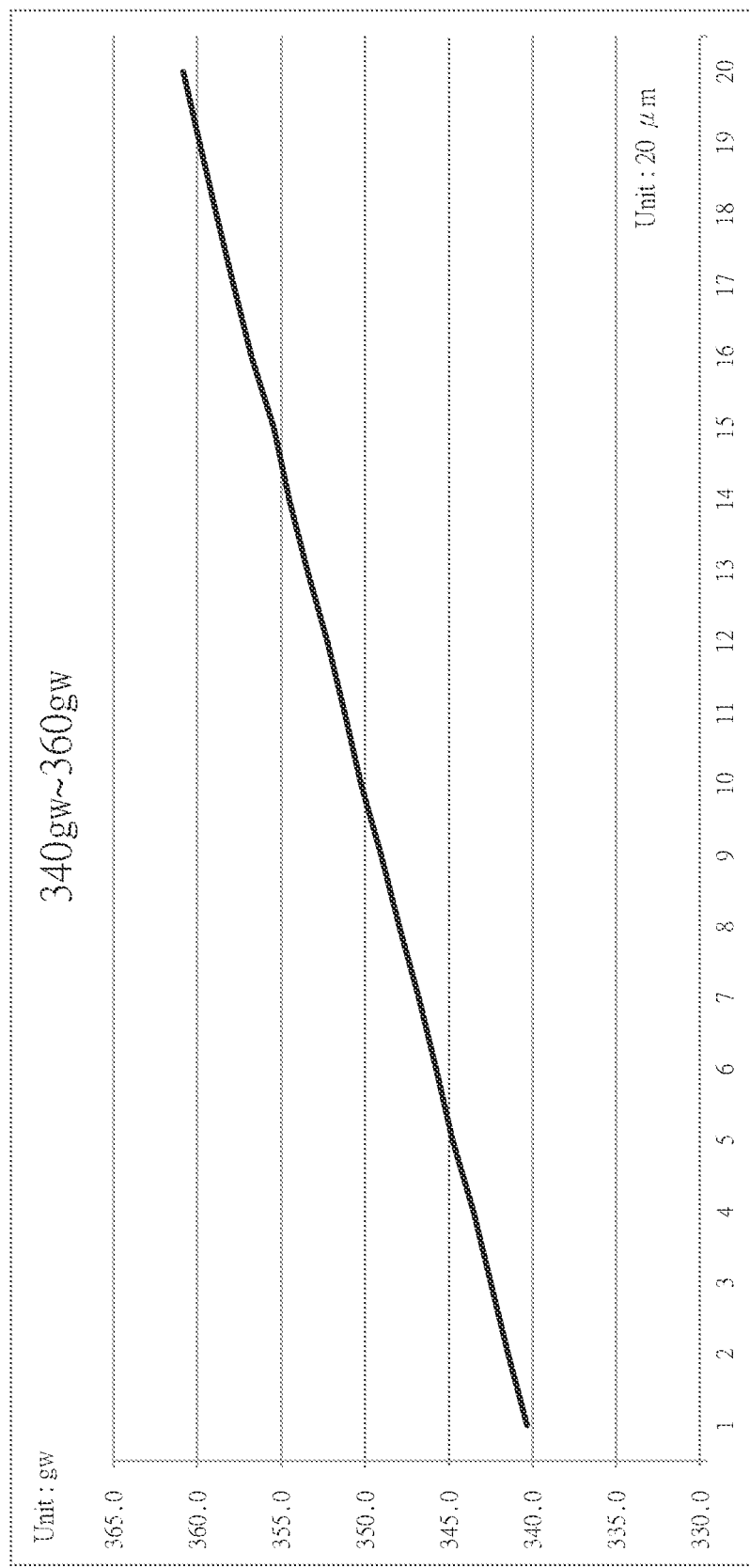
FIG. 11 illustrates a curve view of a pressure value and a moving distance of the object to be measured which the pressure values are between 340 gw and 360 gw and measured by using the object press performance measuring system with the second embodiment of the elastic assembly of the present invention.
Figure 12:
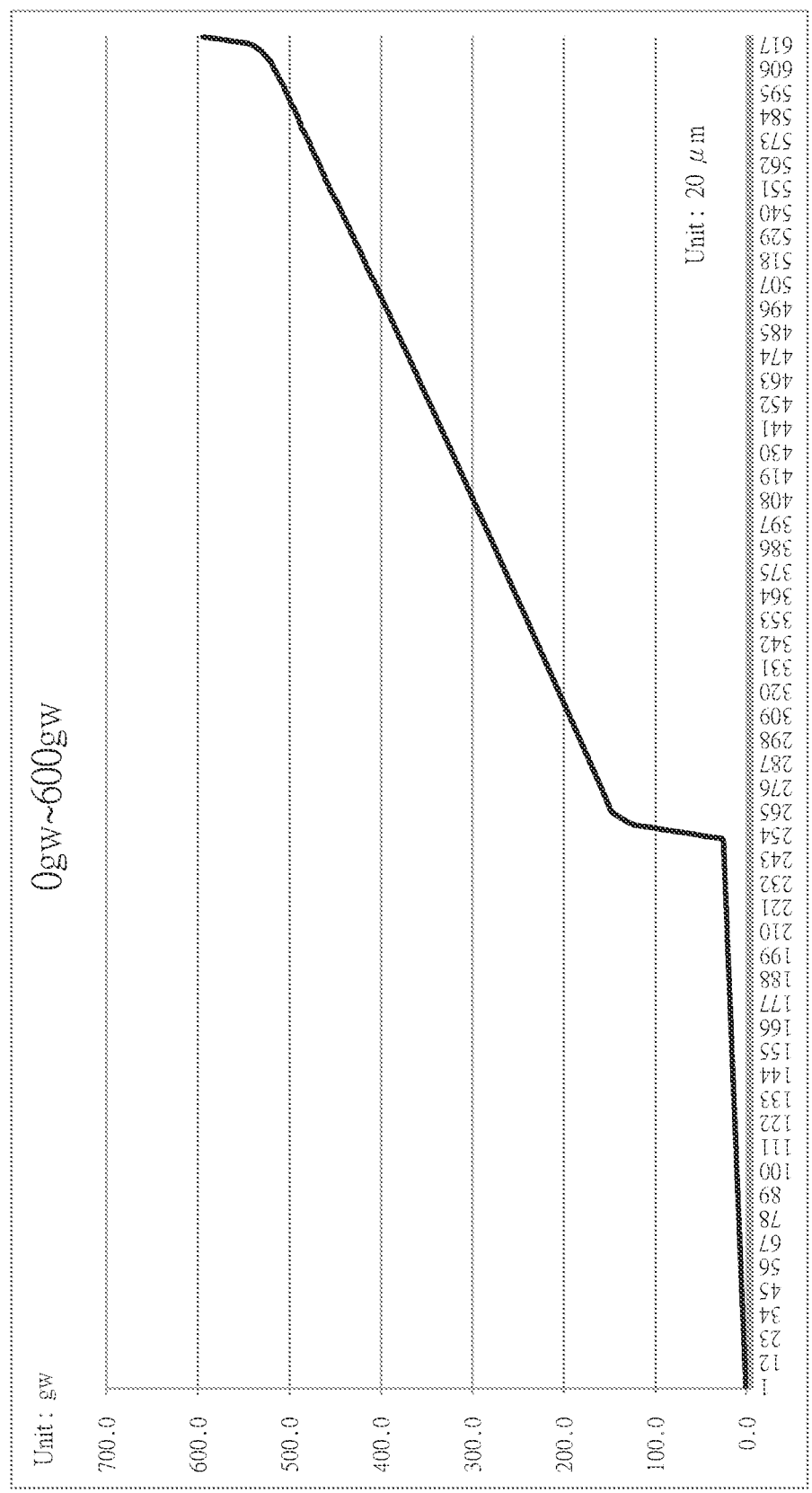
FIG. 12 illustrates a curve view of a pressure value and a moving distance of the object to be measured which the pressure values are between 0 gw and 600 gw and measured by using the object press performance measuring system with the second embodiment of the elastic assembly of the present invention.
Figure 13:
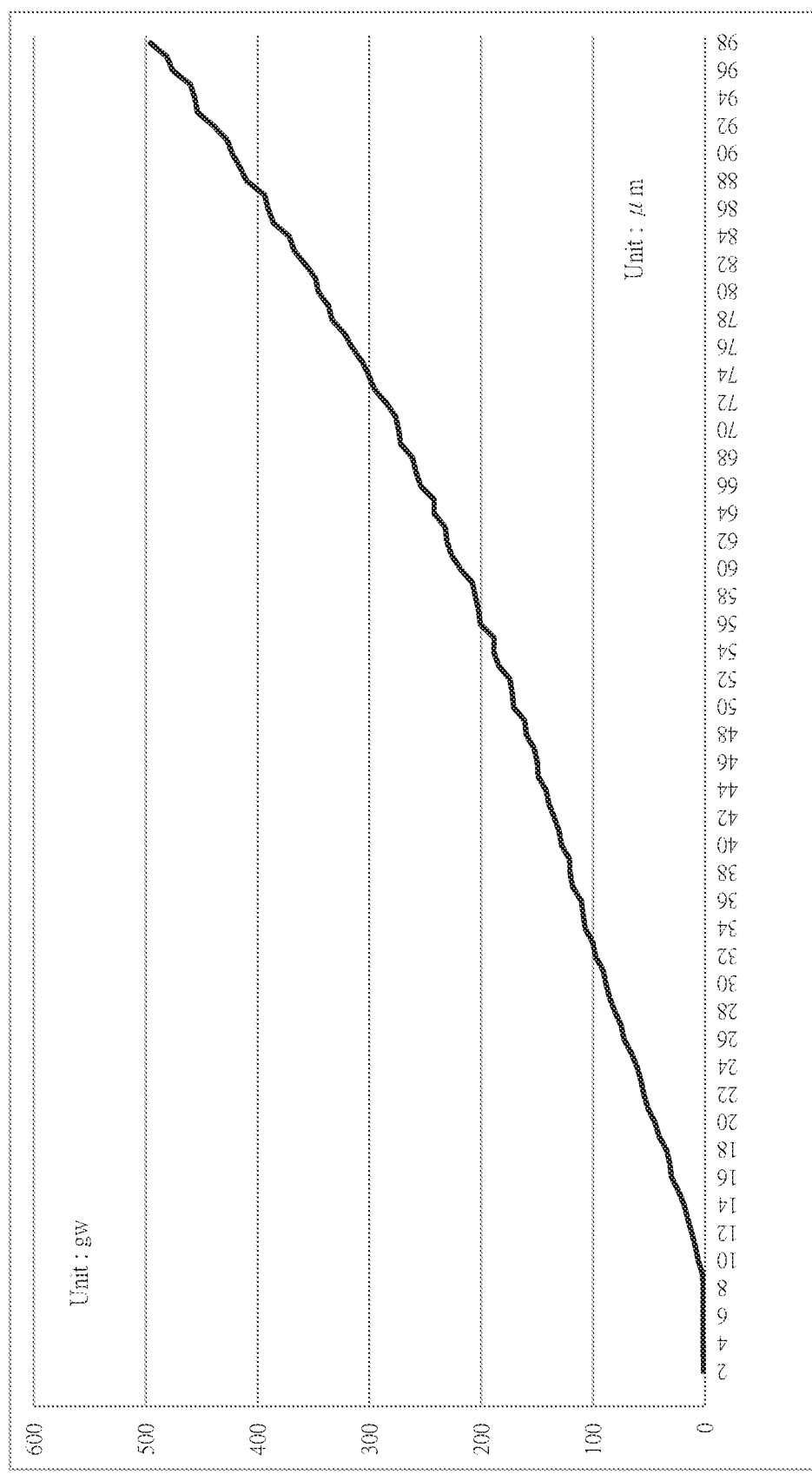
FIG. 13 illustrates a curve view of a pressure value and a moving distance of the object to be measured which is measured without the elastic assembly.

Please refer to FIGS. 7 to 9 together with FIGS. 10 to 13, table 2 and table 3, wherein FIG. 10 illustrates a curve view of a pressure value and a moving distance of the object to be measured which the pressure values are between 4 gw and 6 gw and measured by using the object press performance measuring system with the second embodiment of the elastic assembly of the present invention; FIG. 11 illustrates a curve view of a pressure value and a moving distance of the object to be measured which the pressure values are between 340 gw and 360 gw and measured by using the object press performance measuring system with the second embodiment of the elastic assembly of the present invention; FIG. 12 illustrates a curve view of a pressure value and a moving distance of the object to be measured which the pressure values are between 0 gw and 600 gw and measured by using the object press performance measuring system with the second embodiment of the elastic assembly of the present invention; and FIG. 13 illustrates a curve view of a pressure value and a moving distance of the object to be measured which is measured without the elastic assembly.

TABLE 2 using the object press performance measuring system with the second embodiment of the elastic assembly to obtain data of the target pressure value is ranged between 4 grams to 6 grams.
Object to be measured 90
Measurement

| Distance (μm) | Weight (gw) |
|---|---|
| 4116 | 4.0 |
| 4135 | 4.0 |
| 4155 | 4.1 |
| 4175 | 4.2 |
| 4195 | 4.3 |
| 4216 | 4.4 |
| 4236 | 4.5 |
| 4255 | 4.6 |
| 4275 | 4.7 |
| 4295 | 4.8 |
| 4315 | 4.9 |
| 4335 | 5.0 |
| 4355 | 5.1 |

TABLE 2-continued using the object press performance measuring system with the second embodiment of the elastic assembly to obtain data of the target pressure value is ranged between 4 grams to 6 grams.
Object to be measured 90
Measurement

| Distance (μm) | Weight (gw) |
|---|---|
| 4375 | 5.2 |
| 4395 | 5.3 |
| 4415 | 5.4 |
| 4436 | 5.5 |
| 4455 | 5.6 |
| 4476 | 5.7 |
| 4495 | 5.8 |
| 4515 | 5.8 |
| 4535 | 6.0 |
| 4555 | 6.1 |

TABLE 3 using the object press performance measuring system with the second embodiment of the elastic assembly to obtain data of the target pressure value is ranged between 340 grams to 360 grams.
Object to be measured 90
Measurement

| Distance (μm) | Weight (gw) |
|---|---|
| 12454 | 340.3 |
| 12475 | 341.5 |
| 12494 | 342.5 |
| 12515 | 343.5 |
| 12535 | 344.8 |
| 12555 | 345.8 |
| 12575 | 346.8 |
| 12595 | 348.0 |
| 12615 | 349.0 |
| 12636 | 350.2 |
| 12655 | 351.2 |
| 12675 | 352.2 |
| 12695 | 353.4 |
| 12715 | 354.5 |
| 12735 | 355.4 |
| 12756 | 356.8 |
| 12775 | 357.8 |
| 12795 | 358.9 |
| 12814 | 359.9 |
| 12834 | 360.8 |

As shown in FIG. 10 and table 2, in the interval between 4 gw and 6 gw, the object to be measured 90 moves every 20 μm along the moving direction, the pressure value obtained by the measuring unit 10 changes around 0.1 gw. As shown in FIG. 11 and table 3, in the interval between 340 gw and 360 gw, the object to be measured 90 moves every 20 μm along the moving direction, the pressure value obtained by the measuring unit 10 changes around 1 gw to 1.3 gw; i.e., in the first measuring travel and the second measuring travel, movement of the object to be measured 90 and the changes of the pressure value are in a linear relation. In other words, the pressure value of the object to be measured 90 can be obtained accurately by controlling the moving distance of the object to be measured 90. This linear relation has an advantage especially in the cases of obtaining the pressure value less than the weight of the object to be measured 90 itself and the pressure values reaches the maximum of the target pressure value. The movement of the object to be measured 90 and the changes of the pressure value are in a linear relation both works in both pressure value intervals. Therefore, the manufacturer can precisely obtain the target pressure values of the object to be measured 90 (such as 6 gw or 360 gw) required by clients and the object to be measured 90 can be programed at each one of the target pressure values set by clients to improve the accuracy and production efficiency of programming and manufacturing these kinds of objects. It is noted that because the target pressure values of the object to be measured 90 is obtained by the first assembly 21 and the second assembly 22 respectively; there is a turning point occurred as showing in FIG. 12. In this embodiment, the turning point occurred around 25 gw, but the present invention is not limited to this. The turning point would be changed according to the elastic coefficient of the first elastic unit 211. With the comparison shows among FIGS. 10 to 12 and FIG. 13, there is no linear relation between the pressure value and the moving distance of the object to be measured 90 for the case of the object press performance measuring system without the elastic assembly and resulting in difficulties occur in obtaining the target pressure value and programing the object to be measured 90.

With the design of the elastic assembly 20, 20a of the present invention, the target pressure value can be measured accurately by controlling the movement of the object to be measured 90. Further, the target pressure values needed to programming into the object to be measured 90 set by clients can be measured into multiple segments and the measurement in each segment can be performed by the first assembly 21 and the second assembly 22 respectively to increase the accuracy in obtaining each one of the target pressures values.

It should be noted that although the present invention is disclosed above by embodiments, the embodiments are merely illustrative and not restrictive of the present invention. Equivalent implementation of, or equivalent changes made to without departing from the spirit of the present invention must be deemed falling within the scope of the present invention. Accordingly, the legal protection for the present invention should be defined by the appended claims.

What is claimed is:

1. An object press performance measuring system for measuring a pressure value of an object to be measure, the object press performance measuring system comprising:
   a measuring unit;
   an elastic assembly disposed between the object to be measured and the measuring unit and the elastic assembly comprising a first assembly and a second assembly, wherein the second assembly is disposed between the first assembly and the measuring unit and the first assembly performs a first measuring travel of the object to be measured and the second assembly performs a second measuring travel of the object to be measured, wherein the second measuring travel refers to measure the pressure value greater than the pressure measured in the first measuring travel.

2. The object press performance measuring system as claimed in claim 1, comprising a moving fixture, a driving device, and a control unit, wherein the moving fixture is for carrying the object to be measured; the driving device is connected to the moving fixture; the control unit is signally connected to the measuring unit and the driving device and controls the driving device to drive the moving fixture to move along a moving direction of the object to be measured until the measuring unit measures the pressure value.

3. The object press performance measuring system as claimed in claim 2, wherein the control unit controls the driving device to drive the moving fixture to move along the moving direction of the object to be measured until a target pressure value is reached.

4. The object press performance measuring system as claimed in claim 3, wherein the control unit comprises a programming system, when the measuring unit measures the target pressure value, the programming system programs the object to be measured.

5. The object press performance measuring system as claimed in claim 2, wherein the driving device comprises a sliding block and a guide rail, wherein the sliding block moves up and down along the moving direction of the object to be measured relative to the guide rail.

6. The object press performance measuring system as claimed in claim 1, wherein the first assembly further comprising a first housing, a first elastic unit and an actuating element, wherein the first housing comprises a first accommodating groove; one end of the first elastic unit connects with the actuating element and is accommodated in the first accommodating groove; the first accommodating groove has a first arrival surface; the actuating element is movably constrained in the first accommodating groove; when the first measuring travel begins, the actuating element moves within the first accommodating groove relative to the first housing and continuously presses the first elastic unit until the actuating element contacts the first arrival surface.

7. The object press performance measuring system as claimed in claim 6, wherein the first housing comprises a second accommodating groove; the first accommodating groove locates above and communicates with the second accommodating groove; when the first measuring travel begins, the first elastic unit is being pressed and deformed along the moving direction of the object to be measured unit until the first elastic unit completely accommodates within the second accommodating groove.

8. The object press performance measuring system as claimed in claim 7, wherein the second accommodating groove has a first receiving surface; another end of the elastic unit is constrained within the second accommodating groove and contacts with the first receiving surface; a size of an aperture of the first accommodating groove is greater than a the size of an aperture of the second accommodating groove.

9. The object press performance measuring system as claimed in claim 7, wherein the actuating element comprises a pressing plate and a connection post, the connection post situates beneath the pressing plate and the first elastic unit encircles the connection post; one end of the connection post and one end of the first elastic both connect with the pressing plate.

10. The object press performance measuring system as claimed in claim 9, wherein the first housing comprises a third accommodating groove, the third accommodating groove locates beneath and communicates with the second accommodating groove; a size of an aperture of the third accommodating groove matches a size of an aperture of the connection post; another end of the connection post is moveably constrained within the third accommodating groove.

11. The object press performance measuring system as claimed in claim 9, the actuating element is T-shape and the pressing plate and the connection post are integrally formed.

12. The object press performance measuring system as claimed in claim 7, wherein the first accommodating groove is exposed to a top end of the first housing to form a first opening; the second accommodating groove and the first accommodating groove are aligned to each other along an axis in the moving direction of the object to be measured.

13. The object press performance measuring system as claimed in claim 10, the third accommodating groove is exposed to a bottom end of the first housing to form a second opening; the second accommodating groove and the third accommodating groove are aligned to each other along an axis in the moving direction of the object to be measured.

14. The object press performance measuring system as claimed in claim 12, the first assembly further comprises a first cover body for covering the first opening and before the first measuring travel begins, the first elastic unit is not being pressed and contacts with the actuating element for allowing the actuating element to contacts with the cover body.

15. The object press performance measuring system as claimed in claim 1, wherein the second assembly comprises a second housing and a second elastic unit; the second housing comprises a fourth accommodating groove and a fifth accommodating groove; the fourth accommodating groove situates above and communicates with the fifth accommodating groove; the first assembly accommodates in the fourth accommodating groove; one end of the second elastic unit contacts with a bottom end of the first assembly and another end of the second elastic unit contacts with the fifth accommodating groove.

16. The object press performance measuring system as claimed in claim 15, the fourth accommodating groove comprising a second arrival surface, when the second measuring travel begins, the first assembly moves within the fourth accommodating groove relative to the second housing and continuously presses the second elastic unit until the first assembly contacts the second arrival surface.

17. The object press performance measuring system as claimed in claim 15, wherein the fifth accommodating groove has a second receiving surface, another end of the second elastic unit is constrained in the fourth accommodating groove and touches the second receiving surface; when the second measuring travel begins, the second elastic unit is being pressed and deformed along the moving direction of the object to be measured smoothly until the second elastic unit is completely accommodated within the fifth accommodating groove.

18. The object press performance measuring system as claimed in claim 15, wherein the fourth accommodating groove is exposed to a top end of the second housing to form a third opening; the fifth accommodating groove and the fourth accommodating groove are aligned to each other along an axis in the moving direction of the object to be measured.

19. An object press performance measuring system for measuring a pressure value of an object to be measure, the object press performance measuring system comprising:
    a measuring unit;
    an elastic assembly disposed between the object to be measured and the measuring unit;
    a moving fixture carrying the object to be measured;
    a driving device connected to the moving fixture; and
    a control unit signally connected to the measuring unit and the driving device, wherein the control unit controls the driving device to drive the moving fixture to move along a moving direction of the object to be measured until the measuring unit measures a pressure value of the object to be measured:
    wherein, the elastic assembly comprising a first housing, a first elastic unit and an actuating element, wherein the first housing comprises a first accommodating groove and a second accommodating groove; the first accommodating groove locates above and communicates with the second accommodating groove; the actuating element is movably constrained in the first accommodating groove; one end of the first elastic unit connects with the actuating element and is accommodated in first accommodating groove; another end of the elastic unit is constrained within the second accommodating groove and touches a first receiving surface of the second accommodating groove.

20. The object press performance measuring system as claimed in claim 19, wherein the driving device comprises a sliding block and a guide rail, wherein the sliding block moves up and down along the moving direction of the object to be measured relative to the guide rail.

* * * * *